UNITED STATES PATENT OFFICE.

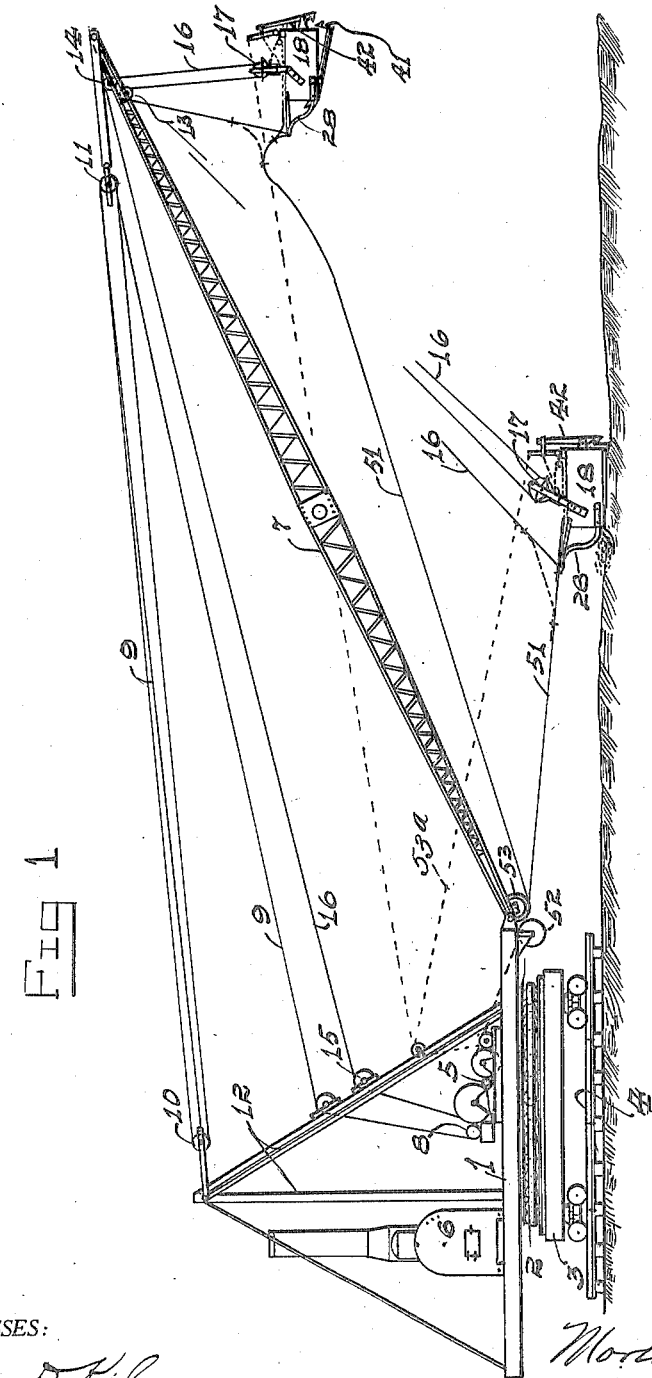

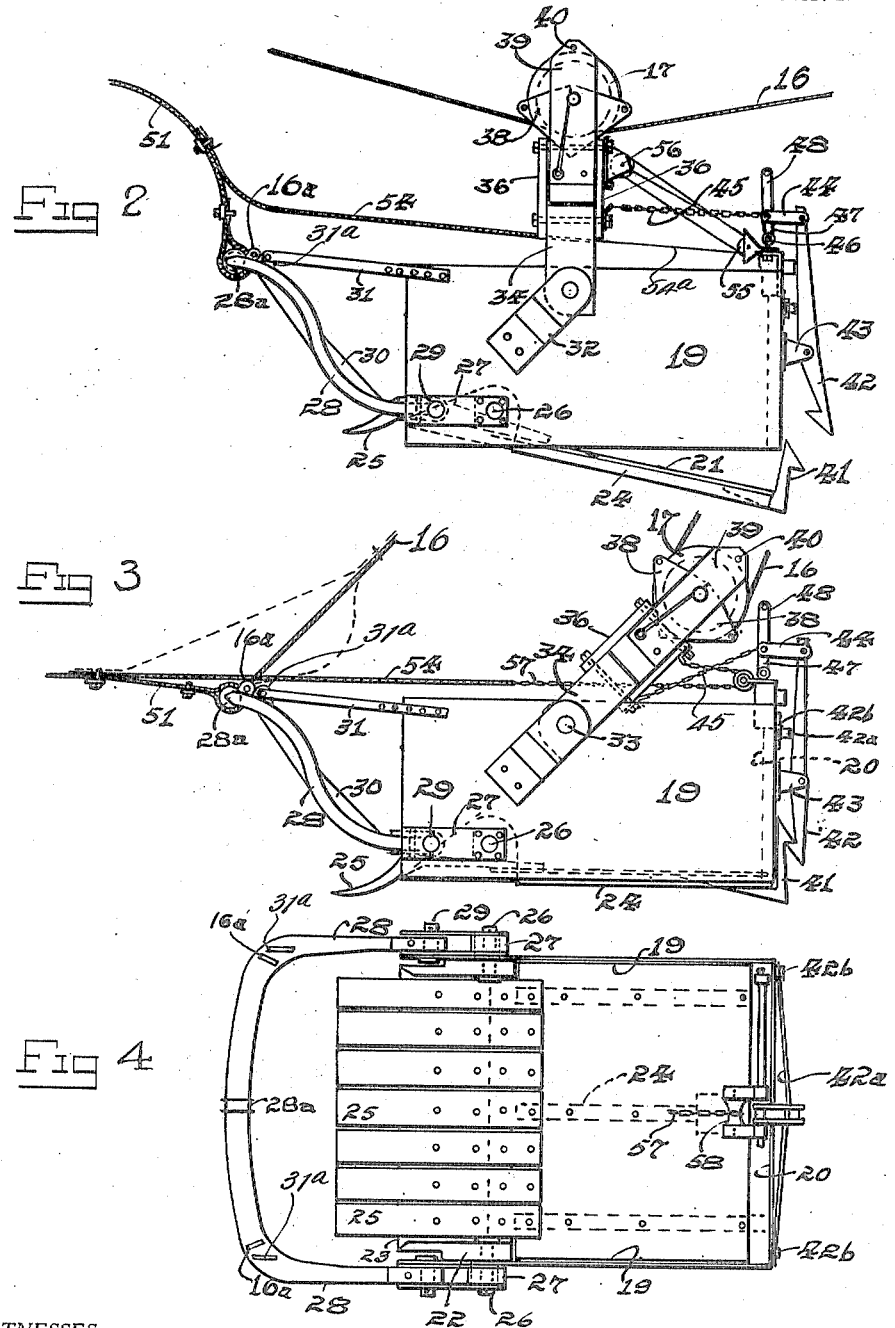

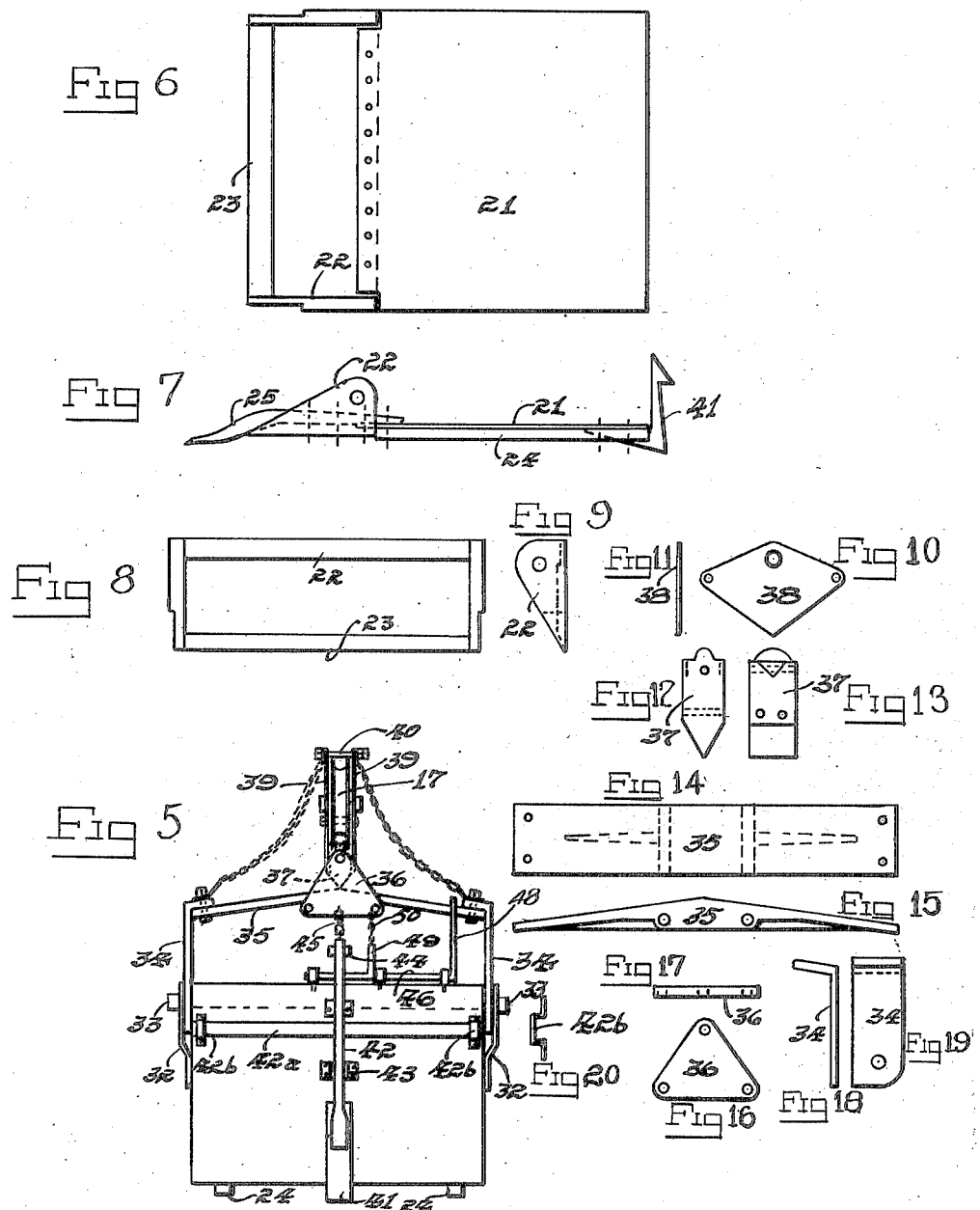

MORTON E. PUGH, OF CHICAGO, ILLINOIS.

EXCAVATOR.

1,316,058.　　　Specification of Letters Patent.　　Patented Sept. 16, 1919.

Application filed October 19, 1914. Serial No. 867,341.

*To all whom it may concern:*

Be it known that I, MORTON E. PUGH, a citizen of the United States, and a resident of the city of Chicago, in the county of Cook and State of Illinois, have invented certain new and useful Improvements in Excavators; and I do hereby declare that the following is a full, clear, and exact description of the same, reference being had to the accompanying drawings, and to the numerals of reference marked thereon, which form a part of this specification.

This invention relates to that class of excavators in which a bucket or shovel is operated entirely by cables and is dragged over the ground toward the power plant or other operating device therefor, and by such movement digging and becoming filled with a quantity of soil.

It is an object therefore of this invention to construct an excavating mechanism embodying a suitable power plant and adjustable boom from which a drag bucket or shovel is operated, said bucket closing automatically when lowered to the ground and opening automatically to discharge its contents after being swung upwardly to the required position.

It is also an object of this invention to construct an excavating device employing a rotatable platform upon which a power plant and movable boom are supported and a drag bucket or shovel connected to the various mechanisms thereof by cables, adapted to load at one end by dragging over the ground, and when elevated therefrom discharging through the bottom at the other end thereof.

It is also an important object of this invention to construct an excavating device employing a traveling platform upon which a power plant and adjustable boom is mounted, and with cables connected to the power plant and to the boom, and to a drag bucket or shovel constructed to automatically fill by dragging over the ground toward said platform, then by elevation from the ground to automatically discharge at a predetermined position through a hinged bottom, said bottom being so constructed and counterbalanced as to automatically close after discharge of the material from the bucket.

It is furthermore an important object of this invention to construct a drag dipper or shovel which is maintained in closed position when a draft exists upon the drag line, and after elevation of the bucket from the ground is automatically opened to discharge position by release of said drag line.

It is finally an object of this invention to construct an improved form of excavating device operating automatically to discharge the contents of the bucket after transfer into a predetermined position, and thereafter automatically moving into closed position.

The invention (in a preferred form) is illustrated in the drawings and hereinafter more fully described.

In the drawings:

Figure 1 is a side elevation illustrating a mechanism embodying the principles of my invention both in loading and in discharge position.

Fig. 2 is an enlarged side elevation of the drag bucket showing the bottom in unlatched or open position.

Fig. 3 is a similar view showing the same closed and provided with a modified form of release line.

Fig. 4 is a top plan view of the drag bucket.

Fig. 5 is a rear elevation of the shovel.

Fig. 6 is a top plan view of the bottom of the shovel with the cutting teeth omitted.

Fig. 7 is an edge view thereof, illustrating the cutting teeth and latching means attached.

Fig. 8 is a top plan view of the cutting edge teeth forming a part of the bottom of the shovel.

Fig. 9 is an end view thereof.

Fig. 10 is a face view of one of the sheave plates.

Fig. 11 is an edge view thereof.

Fig. 12 is a front view of a part of the hoist sheave support.

Fig. 13 is a side view thereof.

Fig. 14 is a plan view of a part of the hoisting bail.

Fig. 15 is a side elevation thereof.

Fig. 16 is a front elevation of the connecting plate between the latch mechanism and the hoisting sheave chain.

Fig. 17 is an edge view thereof.

Fig. 18 is an edge view of one of the elements of the hoisting bail.

Fig. 19 is a face view thereof.

Fig. 20 is a detail of a clamp used in holding a leaf spring in position.

As shown in the drawings:

Referring first to Fig. 1, the reference numeral 1, indicates a turn table or platform mounted to rotate by means of rollers 2, upon a car 3, which in the present instance is shown as a small heavy railway car on a short section of track 4. A steam hoist denoted as a whole by the reference numeral 5, is mounted upon the platform 1, and a boiler 6, is suitably connected therewith to supply steam to the steam cylinders thereof for operating the same. A long boom 7, is connected at one side of the platform 1, and may be raised and lowered by a cable 9, wound upon a windlass 8, of the hoist and trained through blocks 10 and 11, the former secured at the upper end of a fixed platform frame 12, and the latter mounted at the outer end of the boom. A pair of idler sheaves 13 and 14, respectively, are mounted at the outer end of the boom 7, and another idler sheave 15, is mounted on said frame 12, and a hoisting line or cable 16, is trained about a windlass on said hoist and over said idler sheaves and through a sheave 17, swingingly and pivotally mounted upon a bucket or shovel 18, and with the end of said hoist line 16, secured to the forward end of the bucket.

Said bucket or shovel 18, consists of side walls 19, and a rear end wall 20, connected together in any suitable manner. The bottom of the shovel or bucket consists of a heavy plate of metal 21, which has riveted or otherwise rigidly secured to the forward end thereof a bracket piece 22, having a cutting edge 23, forming a part thereof. Said bottom plate 21, is provided with a number of longitudinally disposed reinforcing rib pieces 24, which are riveted or brazed thereto. A plurality of downwardly curved teeth 25, are mounted upon said bracket piece or frame 22, and the forward end of the plate 21, with the pointed ends of said teeth extending beyond and slightly below said cutting edge 23. The bottom plate 21, together with the bracket piece 22 and the teeth 25 is pivoted to the side walls 19, of the shovel by means of pintle bolts 26, which extend through bearing strap members 27, bolted or riveted on the exterior of the side walls 19, of the bucket, and through the end members of said bracket or frame piece 22, said end members, however, being disposed on the inner surface of said side walls 19. Said strap or bracket bearing members 27, also afford a means of attachment for the S-shaped arms 28, of a drag bail, the same being attached upon said bracket bearing members 27, by means of bolts 29 and being reinforced by ribs 30 cast integral therewith. Lugs 16ª, are formed on said bail to which the end of the hoist line 16, is connected. A grooved member 28ª, is also formed centrally on said drag bail around which a drag line hereinafter described, may be attached.

Brace rods 31 are provided, the same being pivotally connected at their ends to brackets 31ª formed on the braces 30 and being adjustably connected at their inner ends to the upper front portion of the bucket 18.

Heavy bearing bracket members 32, are secured on the exterior surface of each of the side walls 19, and pivoted therein by means of pintle bolts 33, is a hoist bail consisting of arms 34, through which said pintle bolts extend, and which, at their upper ends, are flanged over and bolted to a cross piece 35. Bolted to said cross piece 35, are triangular plates 36, which, at their upper ends, have bolted thereto to permit a lateral pivotal movement thereof, a bracket piece 37 having oppositely disposed V-shaped notches near the upper end thereof adapted to receive therein the lower end of heavy sheave plates 38, which are rigidly secured to one another with said sheave 17, journaled therebetween. Thus the sheave is permitted to swing into a vertical position even though the bucket rests upon an inclined side wall of a ditch.

Guard plates 39, are bolted to the bracket piece 37, and extend over the outer surfaces of the sheave plates 38, to a point above the same, and are there connected to one another by means of a bolt 40. A latching device is connected upon the rear wall of the shovel for maintaining the bottom 21, closed, and releasing the same at the proper instant to discharge the contents thereof. For this purpose a rigid hook member 41, is secured at the middle point on the under surface of the dumping bottom 21, and projects upwardly at right angles therefrom, and is adapted to be engaged by the lower hooked end of a latching lever 42, which is pivoted in a bracket 43, on the rear wall 20, of the bucket, and is normally impelled toward latching position by a flat spring 42ª, which is movably mounted in retaining members 42ᵇ, secured on said rear wall 20. A small yoke lever 44, is pivoted upon the upper end of the latch lever 42, and is connected by means of a chain 45, to the middle point of the rear triangular plate 36, on the hoisting bail. A rod 46, is journaled on the upper rear edge of the bucket and integral with and extending upwardly therefrom is a short crank 47, which is also pivoted to said small yoke lever 44. A long actuating lever 48, is rigidly connected to one end of said rod 46, to actuate the same, thereby pulling the yoke lever 44, inwardly and releasing the latching lever 42, to permit the bottom of the shovel to drop down into open position. However, as clearly shown in Fig. 5, another auxiliary lever 49, is integral with said rod 46, and projects upwardly therefrom and in connected by means of a chain 50, to the rear triangular plate 36, on the hoisting bail.

Two different forms of connection of a release line 54 are shown in Figs. 2 and 3, respectively. In Fig. 3, the drag line for the bucket is indicated by the reference numeral 51, and is attached upon the front end of the drag bail, and leads, as clearly shown in Fig. 1, toward the platform on which the hoist is mounted, being trained between idler sheaves 52 and 53, respectively, and thence around a suitable windlass upon the hoist. The dotted lines 53ª shown in Fig. 1, illustrate an auxiliary release line, which may be used if desired, and if so, is connected to the lever 48, on the bucket. The release line 54, is connected to said drag line 51, and leads rearwardly of the bucket and is connected to a wire or cable 54ª which is trained about small blocks 55 and 56, respectively, the former secured upon the rear end of the bucket, and the latter upon the hoisting bail, so that when the drag line 51, is taut the multiplication of power secured, due to the block and tackle arrangement for the release line, pulls the hoisting bail downwardly into a rearwardly inclined position as shown in Fig. 3.

In the construction illustrated in Fig. 3, the release line 54, is connected to a chain 57, which is trained about a small pulley or sheave 58, secured upon the rear end of the bucket, and is then secured directly to the upper end of the hoisting bail.

The operation is as follows:

The device when used as shown in Fig. 1, is drawn or dragged over the ground toward the power plant by the drag line 51, the hoisting line 16, being slackened. Due to the connection of the release line to the drag line the bail for the hoisting sheave 17, is drawn downwardly into the angle position shown in the bucket upon the ground in Fig. 1, and in detail in Fig. 3, so that the latching lever 42, remains engaged with the hook 41, to hold the swinging bottom of the bucket closed. After the bucket has been filled by dragging the same over the ground the hoist line 16, is drawn up, thus elevating the bucket, but the drag line 51, is held taut in order that the release line 54, connected thereto will hold the bail of the hoisting sheave downwardly in angled position to prevent unlatching of the bucket until the same has been swung into a position of discharge by the boom 7, that is directly under, or beyond the end of said boom. When this position is reached the drag line 51, is slackened, thus permitting the hoisting bail to swing into a vertical position shown with the bucket elevated from the ground in Fig. 1, and in detail in Fig. 3, so that the upper end of the latching lever 43, is drawn inwardly, thus unlatching the bottom of the bucket to open and discharge the contents. The auxiliary release line 53ª shown in dotted lines in Fig. 1, is connected to the actuating lever 48 on the bucket to dump the same at any desired position irrespective of the taut drag line 51. The weight of the metal on the hinged swinging bottom of the bucket may be so disposed that after the contents of the bucket have been discharged and the same is being lowered to the ground, the weight of the heavy drag or cutting teeth 25, is sufficient to counter-balance and cause the bottom to practically close, to prevent the same from being opened and bent backwardly when the bucket strikes the ground. Due to the weight of the bucket when striking the ground the bottom is completely closed, the latching mechanism then acting automatically to latch the same in closed position. Of course, the moment the tension is applied upon the drag line 51, the hoisting sheave bail is swung downwardly into an inclined position, so that there is no possibility of the latching mechanism being released until so intended. The S-shaped drag bail arms 28, due to their shape, permit a ready entrance of the material into the bucket.

I am aware that the details of construction may be varied through a wide range without departing from the principles of this invention, and I therefore do not purpose limiting the patent granted otherwise than necessitated by the prior art.

I claim as my invention:

1. In an excavating mechanism, a drag bucket, a drag line connected thereto, a hinged bottom on said bucket, latching mechanism to retain said bottom closed, and connections between said drag line and said latching mechanism whereby the latter is opened when said drag line is slackened.

2. In an excavating mechanism, a drag bucket, a drag line connected thereto, a hinged bottom on said bucket, latching mechanism to retain said bottom closed, a hoisting cable, pivoted means connecting said hoisting cable to said bucket and connected to said latching mechanism, and connections between said drag line and said pivoted means for opening said latching mechanism when said drag line is slackened.

3. In an excavating mechanism, a shovel, a bottom hinged thereto and opening downwardly, a supporting bail pivoted to the side walls of the bucket, a drag line connected to the forward end of the bucket, and means connected to said bail and acting through said bail to release said bottom when said drag line is slackened.

4. In an excavating mechanism, a drag bucket, a drag line connected thereto, a hinged bottom on said bucket, latching mechanism to retain said bottom closed, a hoisting cable, a bail pivoted to said bucket through which said hoisting cable is connected, a connection between said bail and said drag line for retaining said bail tilted when said drag line is taut, and a connection between said bail and said latching mechanism whereby the latter will be unlatched when said bail moves to vertical position.

5. In an excavating mechanism, a drag bucket open at its front, a bottom hinged on said bucket at its front and having a front cutting edge, latching mechanism at the rear of the bucket to retain said bottom closed, a drag line connected to the front end of the bucket, a pivoted bail on said bucket, connections between said bail and said drag line for tilting said bail rearwardly when said drag line is taut, a connection between said bail and said latching mechanism for moving the latter to open position when said bail moves to the vertical position, and a hoisting cable connected to said bail and adapted through the weight of the bucket to move said bail to vertical position when the latter is released by slackening the drag line.

In testimony whereof I have hereunto subscribed my name in the presence of two subscribing witnesses.

MORTON E. PUGH.

Witnesses:
CHARLES W. HILLS, Jr.,
FRANK K. HUDSON.